United States Patent
Lipian

(10) Patent No.: US 7,148,302 B2
(45) Date of Patent: Dec. 12, 2006

(54) CATALYST FOR POLYMERIZATION OF NORBORNENE

(75) Inventor: John-Henry Lipian, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 77 days.

(21) Appl. No.: 11/242,227

(22) Filed: Oct. 3, 2005

(65) Prior Publication Data

US 2006/0074206 A1    Apr. 6, 2006

Related U.S. Application Data

(60) Provisional application No. 60/616,111, filed on Oct. 5, 2004.

(51) Int. Cl.
*C08F 36/04* (2006.01)
*C08F 4/80* (2006.01)

(52) U.S. Cl. ............ 526/282; 526/98; 526/100; 526/111; 526/117; 526/120; 526/123.1; 526/126; 526/128; 526/135; 526/139; 526/141; 526/143; 526/145; 526/147; 526/172; 526/281; 526/283; 526/904; 502/113; 502/117; 502/121; 502/122; 502/123; 502/124; 502/125; 502/128; 502/169; 502/170; 502/172; 502/230

(58) Field of Classification Search ........... 502/113, 502/117, 121, 122, 123, 124, 125, 169, 172, 502/128, 230; 526/111, 115, 117, 120, 123.1, 526/126, 128, 135, 139, 141, 143, 145, 147, 526/282, 283, 904, 98, 281, 172, 100
See application file for complete search history.

(56) References Cited

U.S. PATENT DOCUMENTS 2,537,638 A * 1/1951 Kitchen ............ 585/20
3,631,010 A * 12/1971 Witte et al. ......... 526/143
5,569,730 A * 10/1996 Goodall et al. ...... 526/282

OTHER PUBLICATIONS

Magna et al., The Importance of Imidazolium Substituents in the Use of Imidazolium-Based Room-Temperature Ionic Liquids as Sovents for Palladium-Catalyzed Telomerization of Butadiene with Methanol, Organometallics 2003, 22, 4418-4425.*

Selvakumar, et al., New Palladium Carbene Catalyst for the Heck Reaction of Aryl Chlorides in Ionic Liquids, Organic Letters 2002, 4(18) 3031-3033.*

Okubo, et al., Heck reactions in a non-aqueous ionic liquid using silica-supported palladium complex catalysts, Tetrahedron Letters 43 (2002) 7115-7118.*

Calo', et al., Heck Reaction Catalyzed by Nanosized Palladium on Chitosan in Ionic Liquids, Organometallics 2004, 23, 5154-5158 (Web Publication Date: Sep. 18, 2004.*

* cited by examiner

*Primary Examiner*—Fred Teskin
(74) *Attorney, Agent, or Firm*—Alvin T. Rockhill

(57) ABSTRACT

This invention is based upon the discovery that a catalyst system which is comprised of (a) palladium or a palladium compound and (b) a fluorinated alcohol is effective for polymerizing norbornene-functional monomers into polynorbornene-functional polymers. It has been further discovered that this catalyst system is more effective in polymerizing certain norbornene-functional monomers that are difficult to polymerize, such as norbornene ester monomers, than prior art catalyst systems. The activity of the catalyst systems of this invention can be further improved with respect to polymerizing some monomers by including a Lewis acid and/or a ligand, such as a phosphine or a carbene, in the system. In any case, the catalyst systems of this invention offer the advantage of being soluble in a wide variety of solvents, relatively inexpensive, and capable of polymerizing many norbornene-functional monomers that are difficult to polymerize with conventional catalyst systems. The subject invention more specifically discloses a catalyst system that is especially useful for the polymerization of norbornene-functional monomers which is comprised of (a) palladium or a palladium compound and (b) a fluorinated alcohol. The present invention also reveals a process for synthesizing a norbornene-functional polymer which comprised polymerizing a norbornene-functional monomer in a solvent in the presence of a catalyst system that is comprised of (a) palladium or a palladium compound and (b) a fluorinated alcohol.

20 Claims, No Drawings

CATALYST FOR POLYMERIZATION OF NORBORNENE

This patent application claims the benefit of U.S. Provisional Patent Application Ser. No. 60/616,111, filed on Oct. 5, 2004, and incorporates the teachings thereof herein in their entirety.

BACKGROUND OF THE INVENTION

A process for the synthesis of polynorbornene or "poly(bicyclo[2.2.1]hept-2-ene)" or polyNB for brevity is reported in U.S. Pat. No. 2,721,189. However this original material was found to contain two types of polymers, one brittle, the other thermoformable and "drawable". The brittle polymer was later found to be a low molecular weight saturated polymer which was termed an addition type polymer; and, the thermoformable polymer was shown to be formed by ring opening metathesis polymerization (ROMP). A ROMP polymer has a different structure compared with that of the addition polymer in that (i) the ROMP polymer of one or more NB-functional monomers, contains a repeat unit with one less cyclic unit than did the starting monomer, and, (ii) these are linked together in an unsaturated backbone characteristic of a ROMP polymer and is shown below.

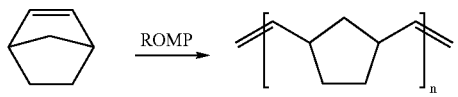

Despite being formed from the same monomer, an addition-polymerized polyNB is clearly distinguishable over the polymer made by ROMP polymerization. Because of the different (addition) mechanism, the repeating unit of the former has no backbone carbon-carbon double bond unsaturation as shown below:

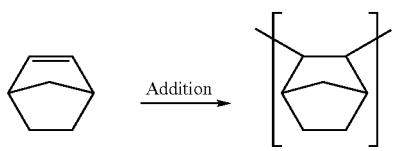

The difference in structures of ROMP and addition polymers of NB-functional monomers is evidenced in their properties, e.g., thermal properties. The addition type polymer of NB has a high glass transition temperature (Tg) of about 370° C. The unsaturated ROMP polymer of NB exhibits a Tg of about 35° C., and exhibits poor thermal stability at high temperature above 200° C. because of its high degree of carbon-carbon unsaturation.

Over the years, reaction conditions have been optimized so as to enable one to choose, and selectively make, either the low molecular weigh addition polymer, or the ROMP polymer. For instance, U.S. Pat. No. 3,330,815 indicates that only the addition polymer is synthesized with $TiCl_4/Et_2AlCl$ or $Pd(C_6H_5CN)_2Cl_2$, under particular conditions, except that the polymers produced are only those in the molecular weight range from 500 to 750 in which range they are too brittle for any practical application.

Addition polymers of norbornene have been shown to be produced with "zirconocene type" catalysts such as those taught by Kaminsky et al. These polymers have been found to be a highly crystalline form of a "norbornene-addition polymer", that is, an addition polymer of a NB-functional monomer, which is totally insoluble, and reportedly does not melt until it decomposes at about 600° C. (under vacuum to avoid oxidation). It is therefore unprocessable (W. Kaminsky et al., J. Mol. Cat. 74, (1992), 109; W. Kaminsky et. al. Makromol. Chem, Macromol. Symp., 47, (1991) 83; and W. Kaminsky, Shokubai, 33, (1991) 536.). An added distinguishing characteristic of the zirconocene catalyst system is that it catalyzes the copolymerization of ethylene and norbornene. In such copolymers, the amount of NB incorporated into the ethylene/NB copolymer can be varied from high to low (W. Kaminsky et. al. Polym. Bull., 1993, 31, 175).

The polymer formed with a zirconocene catalyst can incorporate ethylene (or compounds containing ethylenic unsaturation at a terminal end thereof) in its backbone, randomly, whether in runs of a multiplicity of repeating units, or even a single unit. It should also be noted that the ionic metallocene catalysts, such as zirconocenes and hafnocenes, use metals from Group IVB as the cation with a compatible weakly coordinating anion.

Research has continued toward the production of a melt-processable addition polymer of a NB-type monomer, and is the subject of an on-going effort. By "melt-processable" it is meant that the polymer is adequately flowable to be thermoformed in a temperature window above its glass transition temperature (Tg) but below its decomposition temperature. Norbornene monomer, bicyclo[2.2.1]hept-2-ene or "NB" for brevity, and substituted embodiments thereof, such as ethylidenenorbornene or decylnorbornene, and particularly those monomers of NB having at least one substituent in the 5-(and/or 6-) positions are commonly referred to as "norbornene-functional monomers." The foregoing monomers are characterized by containing a repeating unit resulting from an addition polymerized derivative of bicyclo[2.2.1]hept-2-ene. A first NB-functional monomer may be polymerized by coordination polymerization to form (i) an addition homopolymer; or, (ii) with a second NB-functional monomer, either one (first or second) of which is present in a major molar proportion relative to the other, to form an addition NB-functional copolymer; or, (iii) with a second monomer which is not an NB-functional monomer, present in a minor molar proportion relative to the first, to form an addition copolymer with plural repeating units of at least one NB-functional monomer.

A few years ago the reactivity of cationic, weakly ligated, transition metal compounds was studied in the polymerization of olefins and strained ring compounds, (A. Sen, T. Lai and R. Thomas, J. of Organometal. Chemistry 358 (1988) 567–568, C. Mehler and W. Risse, Makromol. Chem., Rapid Commun. 12, 255–259 (1991)). Pd complexes incorporating the weakly ligating $CH_3CN$ (acetonitrile) ligand in combination with a weakly coordinating counteranion could only be used with aggressive solvents such as acetonitrile or nitromethane. When Sen et al used the complexes to polymerize NB, a high yield of a homopolymer which was insoluble in $CHCl_3$, $CH_2Cl_2$ and $C_6H_6$, was obtained.

The identical experimental procedure, with the same catalyst and reactants, when practiced by Risse et al used one-half the molar amount of each component. Risse et al reported the synthesis of a poly-NB homopolymer which had a number average molecular weight (Mn) of 24,000. In other runs, using different ratios of NB to $Pd^{2+}$ compound, poly-NBs having number average molecular weights of 38,000 and 70,000 respectively with narrow polydispersities Mw/Mn in the range from 1.36 to 1.45, and viscosities in the range from 0.22 to 0.45 dL/g were made. A homopolymer which had a viscosity of 1.1 was synthesized, which upon extrapolation from the molecular weight data given for the prior runs, indicates the weight average molecular weight (Mw) was over 1,000,000. See Mehler and Risse Makromol. Chem., Rapid Commun. 12, 255–9 (1991), experimental section at the bottom of page 258 and the GPC data in Table 1 on page 256. The polymers were soluble in 1,2-dichlorobenzene in which Risse et. al. measured molecular weights by GPC (gel permeation chromatography) and viscometry, as did Maezawa et al in EP 445,755A, discussed below.

Maezawa et al disclosed the production of high molecular weight NB polymers with a two-component catalyst system. The disclosure states that the polymer is preferably formed in the molecular weight range from 100,000 to 10,000,000. The manner of obtaining the desired molecular weight is shown to be by terminating the polymerization reaction after a predetermined period. Such termination is effected by decomposing the catalyst with an external terminating agent such as acidified methanol, which is added to the reaction to stop the polymerization. There is no internal control of the molecular weight within a predetermined range by an agent that does not deactivate the catalyst.

Specifically, three known methods of controlling the molecular weight are suggested: (i) varying the amount of the transition metal compound used; (ii) varying the polymerization temperature; and (iii) using hydrogen as a chain transfer agent "CTA" (see page 9, lines 20–23 of the EP 445,755A disclosure) as suggested by Schnecko, Caspary and Degler in "Copolymers of Ethylene with Bicyclic Dienes" Die Angewandte Makromolekulare Chemic, 20 (1971) 141–152 (Nr.283). Despite the foregoing suggestions, there is no indication in EP 445,755A that any of them was effective, as is readily concluded from the illustrative examples in the specification. As stated in their illustrative Example 1 in which the catalyst included a combination of nickel bisacetylacetonate $Ni(acac)_2$ and methaluminoxane ("MAO"), a polyNB having Mw of $2.22 \times 10^6$ (by GPC) was formed. As shown in Table 1 of EP 445,755A, only Examples 5, 6 and 7, in which the (triphenylphosphine)Ni-containing catalysts were used, made homopolymers with weight average moleculoar weights of 34,000; 646,000; and 577,000 respectively. These nickel catalysts with a triphenylphosphine ligand, are shown to have relatively lower productivity than the biscyclooctadienylnickel (see Example 3) and biscyclopentadienylnickel (Exzmple 4) which were also used.

Allylnickelhalides alone (no Lewis acid cocatalyst) have been used to produce polyNB. The molecular weights of the NB polymer produced in these studies were within the range of 1000 to 1500 (L. Porri, G. Natta, M. C. Gallazzi Chim. Ind. (Milan), 46 (1964), 428). It had been thought that the low yields and the low molecular weights of the polyNB were due to deactivation of the catalysts.

EP 504,418A discloses the use of a nickel catalyst as a transition metal equivalent to zirconium for the production of high molecular weight norbornene polymer with a three component catalyst system (see Example 117). The three-component catalyst was made in situ by combining triisobutylaluminum; dimethylanilinium tetrakis(pentafluorophenyl)borate; and, $Ni(acac)_2$ in toluene. The polymer recovered had a weight average molecular weight (Mw) of $1.21 \times 10^6$ and a polydispersity of 2.37. Though essentially the entire specification is directed to the copolymerization of cycloolefins with α-olefins using zirconium-containing catalysts, Okamoto et al did not react norbornene and α-olefin with a nickel catalyst. Nowhere in the EP 504,418A specification is there a teaching that the use of an α-olefinic CTA will control molecular weight. There is no teaching of a polymer with a terminal olefinic end-group. Nor is there any teaching that an α-olefin would do anything but copolymerize.

The failure to recognize that an a-olefin might function as a CTA, with or without the presence of an alkylaluminum cocatalyst, was understandable since there existed a large body of work related to the copolymerization of cycloolefins with α-olefins, and in none of such polymerizations was there any disclosure that the α-olefin might function as an effective CTA. Further, the great reactivity of ethylene or propylene buttressed an expectation that copolymerization, not chain transfer, is the logical and expected result.

Acyclic olefins, such as 1-hexene, are known to be effective for utilization as a CTA in the ROMP of cyclic olefins, to reduce molecular weight via a cross-metathesis mechanism. ROMP involves a metal carbene (or metal alkylidene) active center which interacts with the cyclic olefin monomer to afford a metallocycloalkane intermediate. A repeating unit contains a carbon-carbon double bond (—C═C—) for every carbon-carbon double bond in the monomer. How effectively the acyclic olefin reduces the molecular weight of the copolymer formed depends on the structure of the olefin and on the catalyst system (K. J. Ivin, Olefin Metathesis, Academic Press, 1983). In contrast, addition (or vinyl type) polymerization of olefins and diolefins involves the insertion of the monomer into a metal-carbon a-bond, as in Ni—C, or Pd—C. Despite the many disclosures relating to the formation of copolymers of NB-type monomers, and the well-known fact that an olefin is an effective chain transfer agent in a ROMP polymerization, it will now be evident why the difference in the mechanisms of chain termination failed to suggest the use of an olefin as a chain transfer agent in the copolymerization taught herein.

U.S. Pat. No. 5,571,881 discloses addition polymers derived from norbornene-functional monomers that are terminated with an olefinic moiety derived from a chain transfer agent selected from a compound having a terminal olefinic double bond between adjacent carbon atoms, excluding styrenes, vinyl ethers, and conjugated dienes wherein at least one of said carbon atoms has two hydrogen atoms attached thereto. The addition polymers of described in this patent are prepared from a single or multicomponent catalyst system including a Group VIII metal ion source. These catalyst systems are unique in that they catalyze the insertion of the chain transfer agent exclusively at a terminal end of the polymer chain. U.S. Pat. No. 5,571,881 more specifically discloses a process for controlling the molecular weight of an addition polymer comprising repeating units polymerized from one or more norbornene-functional monomers, said process comprising reacting a reaction mixture comprising at least one norbornene-functional monomer, a solvent for said monomer and an effective amount of a single or multicomponent catalyst system each comprising a Group VIII transition metal source and a chain transfer agent selected from a compound having a terminal olefinic double bond between adjacent carbon atoms, excluding styrenes, vinyl ethers, and conjugated dienes, and at least one of said adjacent carbon atoms has two hydrogen atoms attached thereto.

SUMMARY OF THE INVENTION

This invention is based upon the discovery that a catalyst system which is comprised of (a) palladium or a palladium compound and (b) a fluorinated alcohol is effective for polymerizing norbornene-functional monomers into polynorbornene-functional polymers. It has been further discovered that this catalyst system is more effective in polymerizing certain norbornene-functional monomers that are difficult to polymerize, such as norbornene ester monomers, than prior art catalyst systems. The activity of the catalyst systems of this invention can be further improved with respect to polymerizing some monomers by including a Lewis acid and/or a ligand, such as a phosphine or a carbene, in the system. In any case, the catalyst systems of this invention offer the advantage of being soluble in a wide variety of solvents, relatively inexpensive, and capable of polymerizing many norbornene-functional monomers that are difficult to polymerize with conventional catalyst systems.

The subject invention more specifically discloses a catalyst system that is especially useful for the polymerization of norbornene-functional monomers which is comprised of (a) palladium or a palladium compound and (b) a fluorinated alcohol.

The present invention also reveals a process for synthesizing a norbornene-functional polymer which comprised polymerizing a norbornene-functional monomer in a solvent in the presence of a catalyst system that is comprised of (a) palladium or a palladium compound and (b) a fluorinated alcohol. Such polymerizations will typically be conducted at a temperature which is within the range of −20° C. to 200° C.

The subject invention further discloses a catalyst system that is especially useful for the polymerization of norbornene-functional monomers which is comprised of (a) a procatalyst reactant of the structural formula $PdXX'L_nL'_m$, wherein X represents a first anionic ligand, wherein X' represents a second anionic ligand, wherein the second anionic ligand can be the same or different from the first anionic ligand, wherein L represents a first neutral ligand, wherein L' represents and second neutral ligand, wherein n is an integer from 0 to 3, wherein m is an integer from 0 to 3, and wherein the second neutral ligand can be the same or different from the first neutral ligand, and (b) an activator of the structural formula $G_{4-n}\text{-}X\text{-}A_n$, wherein X represents a member selected from the group consisting of carbon, silicon, and germanium, wherein G represents a hydrocarbyl radical that is substituted with at least one fluorine atom, wherein A represents a —OH group, a —COOH group, or a —C(O)Cl group, and wherein n represents the integer 1 or the integer 2.

The catalyst system can optionally be further comprised of a cocatalyst of the structural formula $MR_n$, wherein M represents a metal selected from the group consisting of Zn, Ti, Zr, Nb, V, Ta, Sc, Li, Na, Mg, Ca, and Y, wherein the R groups can be the same or different and are selected from the group consisting of alkoxide groups, halides, amides, and phosphides, and hydrocarbyl groups, and wherein n represents an integer from 1 to 6. The cocatalyst can be heterogeneous or homogeneous and can be supported supported on carbon black or polystyrene modified with a phosphine, sulfur, or oxygen.

The catalyst system can optionally also contain a neutral ligand. The neutral ligand will typically be of the structural formula $GR_3$, wherein G represents a member selected from the group consisting of N, P, As, Sb, S and O, and wherein the R groups can be the same or different and represent hydrocarbyl groups or fluorocarbon groups. Some preferred neutral ligands include those of the structural formula:

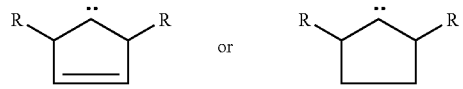

wherein the R groups can be the same or different and represent hydrocarbyl groups or fluorocarbons radicals. The catalyst system can also optionally contain a heterogeneous base of the structural formula: $L^+A^-$, wherein L+ is selected from the group consisting of $K^+$, $Li^+$, $Na^+$, $Mg^+$, $Ca^+$, $Rb^+$, $H^+$, $Ba^+$, and $Cs^+$, and wherein $A^-$ is selected from the group consisting of CO3-, X—, and SO4-, wherein X represents a halogen atom.

The subject invention further reveals a catalyst system that is especially useful for the polymerization of norbornene-functional monomers which is comprised of (a) palladium or a palladium compound and (b) a member selected from the group consisting of fluorinated alcohols, fluorinated acids, and ionic liquids.

DETAILED DESCRIPTION OF THE INVENTION

The norbornene-functional monomers that can be polyrnerized utilizing the catalyst systems of this invention include norbornadiene which can be substituted or unsubstituted. For instance, the norbornene-functional monomer can be of the structural formula

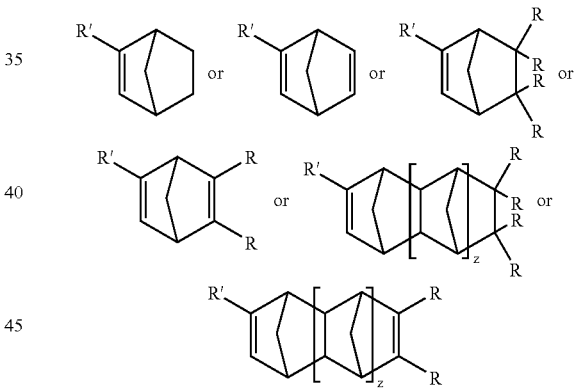

wherein the R groups and the R' groups can be the same or different and represent hydrogen atoms, halogen atoms, branched and unbranched alkyl groups containing from 1 to 20 carbon atoms, branched and umbranched haloalkyl groups containing from 1 to 20 carbon atoms, substituted and unsubstituted cycloalkyl groups containing from 5 to 20 carbon atoms, alkylidenyl groups containing from 1 to 6 carbon atoms, aryl groups containing from 6 to 40 carbon atoms, haloaryl groups containing from 6 to 40 carbon atoms, aralkyl groups containing from 7 to 15 carbon atoms, haloaralkyl groups containing from 7 to 15 carbon atoms, alkynyl groups containing from 3 to 20 carbon atoms, branched and unbranched alkenyl groups containing from 3 to 20 carbon atoms, provided the alkenyl radical does not contain a terminal double bond, that is the double band in the radical is an internal olefinic bond, or vinyl; two R groups when taken with the two ring carbon atoms to which they are attached can represent saturated and unsaturated cyclic groups containing 4 to 12 carbon atoms or an aromatic ring containing 6 to 17 carbon atoms; and wherein z represents an integer from 1 to 5. It should be noted that When R represents an alkylidene radical the carbon atom to which the alkylidene radical is connected does not have another substituent, and when the carbon atom to which the R group is connected has a double bond the R group cannot be an alkylidenyl group. R' will normally represent a hydrogen atom. However, in some cases it is advantageous for R' to represent a vinyl group.

Examples of norbornene-functional monomers include norbornadiene, 2-norbornene, 5-methyl-2-norbornene, 2-vinyl-2-norbornene, 5-hexyl-2-norbornene, 5-ethylidenyl-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (for example, symmetrical and asymmetrical trimers) and halogenated norbornadiene and norbornene-functional monomers wherein the R groups independently represent hydrogen, halogen (for example, Cl, F, I, Br) and fully halogenated alkyl groups of the formula $C_nF_{2n+1}$ wherein n represents the number of carbon atoms from 1 to 20. Representative substituents are trifluoromethyl, $-C_4F_9$, $-C_{10}F_2$, and $-C_{20}F_{41}$. Accordingly, 2-vinyl-2-norbornene can be polymerized to produce poly(2-vinyl-2-norbornene).

The halogenated norbornene-functional monomers can be synthesized via the Diels-Alder reaction of cyclopentadiene with the appropriate halogenated dieneophile as shown in the following reaction schemes:

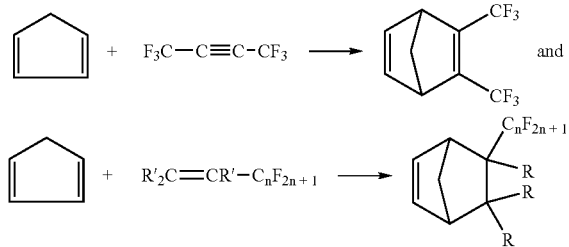

wherein R' independently represents hydrogen or F and n is an integer from 1 to 20.

Some further examples of norbornene-functional monomers that can be polymerized with the catalyst systems of this invention include those of the structural formula:

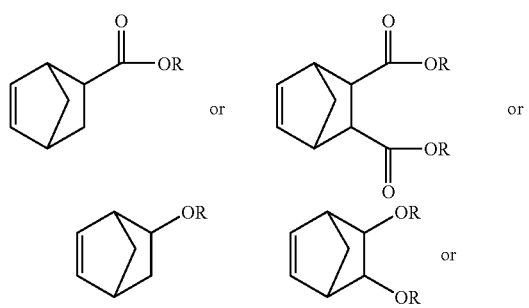

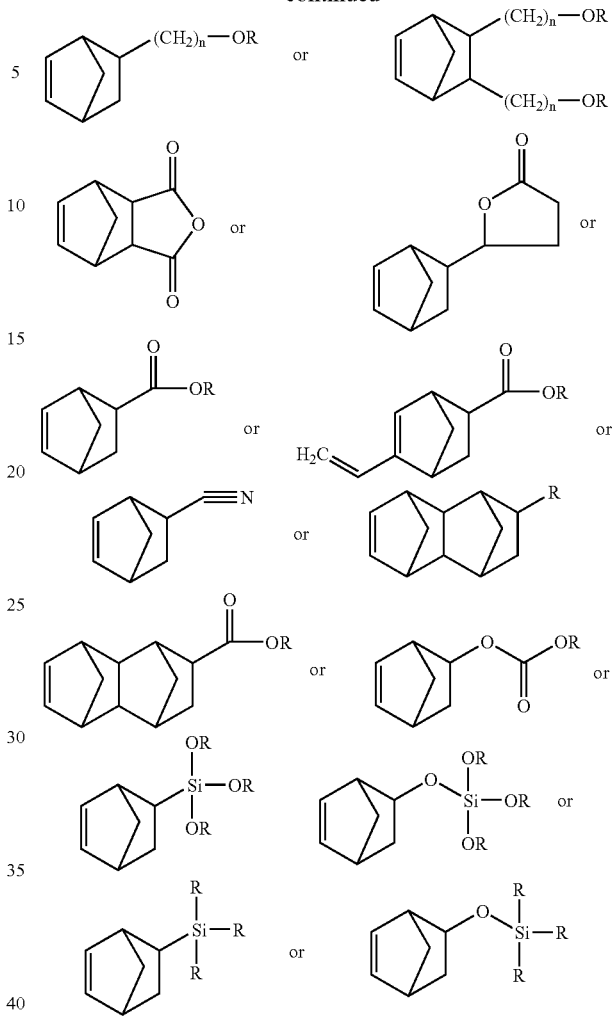

Some representative examples of norbornene-type monomers that can be polymerized with the catalyst systems of this invention include, but are not limited, to following: norbornene (bicyclo[2.2.1]hept-2-ene), 5-ethylidenenorbornene, dicyclopentadiene, tricyclo[5.2.1.0$^{2,6}$]deca-8-ene, 5-methoxycarbonylbicyclo[2.2.1]hept-2-ene, 5-methylbicyclo[2.2.1]hept-2-ene-5-carboxylic acid, 5-methylbicyclo[2.2.1]hept-2-ene, 5-ethylbicyclo[2.2.1]hept-2-ene, 5-ethoxycarbonylbicyclo[2.2.1]hept-2-ene, 5-n-propoxycarbonylbicyclo[2.2.1]hept-2-ene, 5-i-propoxycarbonylbicyclo[2.2.1]hept-2-ene, 5-n-butoxycarbonylbicyclo[2.2.1]hept-2-ene, 5-(2-methylpropoxy)carbonylbicyclo[2.2.1]hept-2-ene, 5-(1-methylpropoxy)carbonylbicyclo[2.2.1]hept-2-ene, 5-t-butoxycarbonylbicyclo[2.2.1]hept-2-ene, 5-cyclohexyloxycarbonylbicyclo[2.2.1]hept-2-ene, 5-(4'-t-butylcyclohexyloxy)carbonylbicyclo[2.2.1]hept-2-ene, 5-phenoxycarbonylbicyclo[2.2.]hept-2-ene, 5-tetrahydrofuranyloxycarbonylbicyclo[2.2.1]hept-2-ene, 5-tetrahydropyranyloxycarbonylbicyclo[2.2.1]hept-2-ene, bicyclo[2.2.1]hept-2-ene-5-carboxylic acid, 5-acetyloxybicyclo[2.2.1]hept-2-ene, 5-methyl-5-methoxycarbonylbicyclo[2.2.1]hept-2-ene, 5-methyl-5-ethoxycarbonylbicyclo[2.2.1]hept-2-ene, 5-methyl-5-n-propoxycarbonylbicyclo[2.2.1]hept-2-ene, 5-methyl-5-i-propoxycarbonylbicyclo[2.2.1]hept-2-ene, 5-methyl-5-n-butoxycarbonylbicyclo[2.2.1]hept-2-ene, 5-methyl-5-(2-methylpropoxy)carbonylbicyclo[2.2.1]hept-2-ene, 5-methyl-5-(1-methylpropoxy)carbonylbicyclo[2.2.1]hept-2-ene, 5-methyl-5-t-butoxycarbonylbicyclo[2.2.1]hept-2-ene, 5-methyl-5-cyclohexyloxycarbonylbicyclo[2.2.1]hept-2-ene, 5-methyl-5-(4'-t-butylcyclohexyloxy)carbonylbicyclo[2.2.1]hept-2-ene, 5-methyl-5-phenoxycarbonylbicyclo[2.2.1]hept-2-ene, 5-methyl-5-tetrahydrofuranyloxycarbonylbicyclo[2.2.1]hept-2-ene, 5-methyl-5-tetrahydropyranyloxycarbonylbicyclo[2.2.1]hept-2-ene, 5-methyl-5-acetyloxybicyclo[2.2.1]hept-2-ene, 5-methyl-5-cyanobicyclo[2.2.1]hept-2-ene, 5,6-di(methoxycarbonyl)bicyclo[2.2.1]hept-2-ene, 5,6-di(ethoxycarbonyl)bicyclo[2.2.1]hept-2-ene, 5,6-di(n-propoxycarbonyl)-bicyclo[2.2.1]hept-2-ene, 5,6-di(i-propoxycarbonyl)bicyclo[2.2.1]hept-2-ene, 5,6-di(n-butoxycarbonyl)bicyclo[2.2.1]hept-2-ene, 5,6-di(t-butoxycarbonyl)bicyclo[2.2.1]hept-2-ene, 5,6-di(phenoxycarbonyl)-bicyclo[2.2.1]hept-2-ene, 5,6-di(tetrahydrofuranyloxycarbonyl)bicyclo[2.2.1]hept-2-ene, 5,6-di(tetrahydropyranyloxycarbonyl)bicyclo[2.2.1]hept-2-ene, 5,6-dicarboxyanhydridebicyclo[2.2.1]hept-2-ene, 8-methoxycarbonyltetracyclo[4.4.0.1$^{2,5}$.1$^{7,10}$]dodec-3-ene, 8-ethoxycarbonyltetracyclo[4.4.0.1$^{2,5}$.1$^{7,10}$]dodec-3-ene, 8-n-propoxycarbonyltetracyclo[4.4.0.1$^{2,5}$.1$^{7,10}$]dodec-3-ene, 8-i-propoxycarbonyltetracyclo[4.4.0.1$^{2,5}$.1$^{7,10}$]dodec-3-ene, 8-n-butoxycarbonyltetracyclo[4.4.0.1$^{2,5}$.1$^{7,10}$]dodec-3-ene, 8-(2-methylpropoxy)carbonyltetracyclo[4.4.0.1$^{2,5}$.1$^{7,10}$]dodec3-ene, 8-(1-methylpropoxy)carbonyltetracyclo[4.4.0.1$^{2,5}$.1$^{7,10}$]dode-c-3-ene, 8-t-butoxycarbonyltetracyclo[4.4.0.1$^{2,5}$.1$^{7,10}$]dodec-3-ene, 8-cyclohexyloxycarbonyltetracyclo[4.4.0.1$^{2,5}$.1$^{7,10}$]dodec-3-ene, 8-(4'-t-butylcyclohexyloxy)carbonyltetracyclo[4.4.0.1$^{2,5}$.1$^{7,10}$]-dodec-3-ene, 8-phenoxycarbonyltetracyclo[4.4.0.1$^{2,5}$.1$^{7,10}$]dodec-3-ene, 8-tetrahydrofuranyloxycarbonyltetracyclo[4.4.0.1$^{2,5}$.1$^{7,10}$]-3-dodecene, 8-tetrahydropyranyloxycarbonyltetracyclo[4.4.0.1$^{2,5}$.1$^{7,10}$]dodec-3-ene, 8-acetyloxytetracyclo[4.4.0.1$^{2,5}$.1$^{7,10}$]dodec-3-ene, 8-methyl-8-methoxycarbonyltetracyclo[4.4.0.1$^{2,5}$.1$^{7,10}$]dodec-3-ene, 8-methyl-8-ethoxycarbonyltetracyclo[4.4.0.1.sup.2,5.1.sup.7,10-]dodec-3-ene, 8-methyl-8-n-propoxycarbonyltetracyclo[4.4.0.1$^{2,5}$.1$^{7,10}$]dodec-3-ene, 8-methyl-8-i-propoxycarbonyltetracyclo[4.4.0.1$^{2,5}$.1$^{7,10}$]dodec-3-ene, 8-methyl-8-n-butoxycarbonyltetracyclo[4.4.0.1$^{2,5}$.1$^{7,10}$]dodec-3-ene, 8-methyl-8-(2-methylpropoxy)carbonyltetracyclo[4.4.0.1$^{2,5}$.1$^{7,10}$]dodec-3-ene, 8-methyl-8-(1-methylpropoxy)carbonyltetracyclo[4.4.0.1$^{2,5}$.1$^{7,10}$]dodec-3-ene, 8-methyl-8-t-butoxycarbonyltetracyclo[4.4.0.1$^{2,5}$.1$^{7,10}$]dodec-3-ene, 8-methyl-8-cyclohexyloxycarbonyltetracyclo[4.4.0.1$^{2,5}$.1$^{7,10}$]dodec-3-ene, 8-methyl-8-(4'-t-butylcyclohexyloxy)carbonyltetracyclo[4.4.0.1$^{2,5}$.1$^{7,10}$]dodec-3-ene, 8-methyl-8-phenoxycarbonyltetracyclo[4.4.0.1$^{2,5}$.1$^{7,10}$]dodec-3-ene, 8-methyl-8-tetrahydrofuranyloxycarbo-nyltetracyclo[4.4.0.1$^{2,5}$.1$^{7,10}$]-3-dodecene, 8-methyl-8-tetrahydropyranyloxycarbonyltetracyclo[4.4.0.1$^{2,5}$.1$^{7,10}$]-3-dodecene, 8-methyl-8-acetyloxytetracyclo[4.4.0.1$^{2,5}$.1$^{7,10}$]dodec-3-ene, 8-methyl-8-cyanotetracyclo[4.4.0.1$^{2,5}$.1$^{7,10}$]dodec-3-ene, 8,9-di(methoxycarbonyl)tetracyclo[4.4.0.1$^{2,5}$.1$^{7,10}$]dodec-3-ene, 8,9-di(ethoxycarbonyl)tetracyclo[4.4.0.1$^{2,5}$.1$^{7,10}$]dodec-3-ene, 8,9-di(n-propoxycarbonyl)tetracyclo[4.4.0.1$^{2,5}$.1$^{7,10}$]dodec-3-ene, 8,9-di(i-propoxycarbonyl)tetracyclo[4.4.0.1$^{2,5}$.1$^{7,10}$]dodec-3-ene, 8,9-di(n-butoxycarbonyl)tetracyclo[4.4.0.1$^{2,5}$.1$^{7,10}$]dodec-3-ene, 8,9-di(t-butoxycarbonyl)tetracyclo[4.4.0.1$^{2,5}$.1$^{7,10}$]dodec-3-ene, 8,9-di(cyclohexyloxycarbonyl)tetracyclo[4.4.0.1$^{2,5}$.1$^{7,10}$]dodec-3-ene, 8,9-di(phenoxycarbonyl)tetracyclo[4.4.0.1$^{2,5}$.1$^{7,10}$]dodec-3-ene, 8,9-di(tetrahydrofuranyloxycarbonyl)tetracyclo[4.4.0.1$^{2,5}$.1$^{7,10}$]-3-dodecene, 8,9-di(tetrahydropyranyloxycarbonyl)tetracyclo[4.4.0.1$^{2,5}$.1$^{7,10}$]-3-dodecene, 8,9-dicarboxyanhydridetetracyclo[4.4.0.1$^{2,5}$.1$^{7,10}$]dodec-3-ene, tetracyclo[4.4.0.1$^{2,5}$.1.$^{7,10}$]dodec-3-ene, tetracyclo[4.4.0.1$^{2,5}$.1$^{7,10}$]dodec-3-ene-8-carboxylic acid, 8-methyltetracyclo[4.4.0.1$^{2,5}$.1$^{7,10}$]dodec-3-ene-8-carboxylic acid, 8-methyltetracyclo[4.4.0.1$^{2,5}$.1$^{7,10}$]dodec-3-ene, 8-ethyltetracyclo[4.4.0.1$^{2,5}$.1$^{7,10}$]dodec-3-ene, 8-fluorotetracyclo[4.4.0.1.sup.2,5.1.sup.7,10]dodec-3-ene, 8-fluoromethyltetracyclo[4.4.0.1$^{2,5}$.1.$^{7,10}$]dodec-3-ene, 8-difluoromethyltetracyclo[4.4.0.1$^{2,5}$.1.$^{7,10}$]dodec-3-ene, 8-pentafluoromethyltetracyclo[4.4.0.1$^{2,5}$.1$^{7,10}$]dodec-3-ene, 8-difluoroethyltetracyclo[4.4.0.1$^{2,5}$.1$^{7,10}$]dodec-3-ene, 8,8-difluorotetracyclo[4.4.0.1$^{2,5}$.1$^{7,10}$]dodec-3-ene, 8,9-difluoro tetracyclo[4.4.0.1$^{2,5}$.1$^{7,10}$]dodec-3-ene 8,8-bis(trifluoromethyl)tetracyclo[4.4.0.1$^{2,5}$.1$^{7,10}$]dodec-3-ene, 8,9-bis(trifluoromethyl)tetracyclo[4.4.0.1$^{2,5}$.1$^{7,10}$]dodec-3-ene, 8-methyl-8-trifluoromethyltetracyclo[4.4.0.1$^{2,5}$.1$^{7,10}$]dodec-3-ene, 8,8,9-trifluorotetracyclo[4.4.0.1$^{2,5}$.1$^{7,10}$]dodec-3-ene, 8,8,9-tris(trifluoromethyl)tetracyclo[4.4.0.1$^{2,5}$.1$^{7,10}$]dodec-3-ene, 8,8,9,9-tetrafluorotetracyclo[4.4.0.1$^{2,5}$.1$^{7,10}$]dodec-3-ene, 8,8,9,9-tetrakis(trifluoromethyl)tetracyclo[4.4.0.1$^{2,5}$.1$^{7,10}$]dodec-3-ene, 8,8-difluoro-9,9-bis(trifluoromethyl)tetracyclo[4.4.0.1$^{2,5}$.1$^{7,10}$]dodec-3-ene, 8,9-difluoro-8,9-bis(trifluoromethyl)tetracyclo[4.4.0.1$^{2,5}$.1$^{7,10}$]dodec-3-ene, 8,8,9-trifluoro-9-trifluoromethyltetracyclo[4.4.0.1.$^{2,5}$.1$^{7,10}$]dodec-3-ene, 8,8,9-trifluoro-9-trifluoromethoxytetracyclo[4.4.0.1$^{2,5}$.1$^{7,10}$]dodec-3-ene, 8,8,9-trifluoro-9-pentafluoropropoxytetracyclo[4.4.0.1$^{2,5}$.1$^{7,10}$]dodec-3-ene, 8-fluoro-8-pentafluoroethyl-9,9-bis(trifluoromethyl)tetracyclo[4.4.0.1$^{2,5}$.1$^{7,10}$]dodec-3-ene, 8-9-difluoro-8-heptafluoroisopropyl-9-trifluoromethyltetracyclo[4.4.0.1$^{2,5}$.1$^{7,10}$]-dodec-3-ene, 8-chloro-8,9,9-trifluorotetracyclo[4.4.0.1$^{2,5}$.1$^{7,10}$]dodec-3-ene, 8,9-dichloro-8,9-bis(trifluoromethyl)tetracyclo[4.4.0.1$^{2,5}$.1$^{7,10}$]dodec-3-ene, 8-(2,2,2-trifluorocarboxyethyl)tetracyclo[4.4.0.1$^{2,5}$.1$^{7,10}$]dodec-3-ene, 8-methyl-8-(2,2,2-trifluorocarboxyethyl)tetracyclo[4.4.0.1$^{2,5}$.1$^{7,10}$]dodec-3-ene, tricyclo[4.4.0.1$^{2,5}$]undeca-3-ene, tricyclo[6.2.1.0$^{1,8}$]undeca-9-ene, tetracyclo[4.4.0.1$^{2,5}$.1$^{7,10}$.0$^{1,6}$]dodec-3-ene, 8-methyltetracyclo[4.4.0.1$^{2,5}$.1$^{7,10}$.0$^{1,6}$]dodec-3-ene, 8-ethylidenetetracyclo[4.4.0.1$^{2,5}$.1$^{7,12}$]dodec-3-ene, 8-ethylidenetetracyclo[4.4.0.1$^{2,5}$.1$^{7,10}$.0$^{1,6}$]dodec-3-ene, pentacyclo[6.5.1.1$^{3,6}$.0$^{2,7}$.0$^{9,13}$]pentadeca-4-ene, and pentacyclo[7.4.0.1$^{2,5}$.1$^{9,12}$.0$^{8,13}$]pentadeca-3-ene.

There are no restrictions on the palladium metal compound so long as it provides a source of catalytically active palladium metal ions. Preferably, the palladium compound is soluble or can be made to be soluble in the reaction medium. The palladium compound can be comprised of ionic and/or neutral ligand(s) bonded to the palladium metal. The ionic and neutral ligands that can be used are selected from a variety of monodentate, bidentate, or multidentate moieties and combinations thereof.

Representative of the ionic ligands that can be bonded to the palladium metal to form the palladium compound are anionic ligands selected from the halides, such as chloride, bromide, iodide or fluoride ions; pseudohalides such as cyanide, cyanate, thiocyanate, hydride; carbanions, such as branched and unbranched ($C_1$–$C_{40}$) alkylanions, phenyl anion; cyclopentadienylide anions; π-allyl groupings; enolates of β-dicarbonyl compounds such as acetylacetonoate, 2,4-pentanedionate and halogenated acetylacetonates, such as 1,1,1,5,5,5-hexafluoro-2,4-pentanedionate, 1,1,1-trifluoro-2,4,pentanedionate; anions of acidic oxides of carbon, such as carboxylates and halogenated carboxylates (for example, acetates, 2-ethylhexanoate, neodecanoate, trifluoroacetate, and the like) and oxides of nitrogen (for example., nitrates, nitrites, and the like) of bismuth (for example., bismuthate, and the like), of aluminum (for example., aluminates, and the like), of silicon (for example, silicate, and the like), of phosphorous (for example, phosphates, phosphites, phosphines, and the like) of sulfur (for example, sulfates, such as triflate, p-toluene sulfonate, sulfites, and the like); ylides; amides; imides; oxides; phosphides; sulfides; $(C_6-C_{24})$ aryloxides, $(C_1-C_{20})$ alkoxides, hydroxide, hydroxy $(C_1-C_{20})$ alkyl; catechols; oxylate; chelating alkoxides and aryloxides.

Suitable neutral ligands which can be bonded to the palladium metal are the olefins; the acetylenes; carbon monoxide; nitric oxide, nitrogen compounds such as ammonia, isocyanide, isocyanate, isothiocyanate; pyridines and pyridine derivatives (for example, 1,10-phenanthroline, 2,2'-dipyridyl), 1,4-dialkyl-1,3-diazabutadiene, amines such as represented by the formulae: $N(R^4)_3$, $N(R^4)_2$—$(CH_2)_n$—N$(R^4)_2$, and $N(R^4)_2$—$(CH_2)_n$—$NR^4$—$(CH_2)_n$—$NR^4)_2$, wherein $R^4$ is independently hydrocarbyl or substituted hydrocarbyl as previously defined and n is 2 to 10. The neutral ligand can also be selected from ureas; nitriles, such as acetonitrile, benzonitrile and halogenated derivatives thereof; organic ethers, such as dimethyl ether of diethylene glycol, dioxane, tetrahydrofuran, furan diallyl ether, diethyl ether, cyclic ethers, such as diethylene glycol cyclic oligomers; organic sulfides such as diethyl sulfide; thioethers; arsines; stibines; phosphines such as triarylphosphines (for example, triphenylphosphine), trialkylphosphines (for example, trimethyl, triethyl, tripropyl, tripentacosyl, and halogenated derivatives thereof), bis(diphenylphosphino)ethane, bis(diphenylphosphino)propane, bis(dimethylphosphino)propane, bis(diphenylphosphino)butane, (S)-(-)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula: $P(R^4)_3$, wherein $R^4$ independently represents a hydrocarbyl or substituted hydrocarbyl as previously defined; phosphorus oxyhalides; phosphonates; phosphonites, phosphinites, ketones; sulfoxides, such as $C_1-C_{20}$ alkylsulfoxides; $C_6-C_{20}$ arylsulfoxides, $C_7-C_{40}$ alkarylsulfoxides, and the like. It should be recognized that the foregoing neutral ligands can be utilized as optional third components in the catalyst systems of this invention.

Some representative examples of palladium compounds that can be used include: trans-$PdCl_2(PPh_3)_2$, palladium (II) bis(trifluoroacetate), palladium (II) bis(acetylacetonate), palladium (II) 2-ethylhexanoate, $Pd(acetate)_2(PPh_3)_2$, palladium (II) bromide, palladium (II) chloride, palladium (II) iodide, palladium (II) oxide, dichlorobis(acetonitrile) palladium (II), dichlorobis(triphenylphosphine) palladium (II), dichlorobis(benzonitrile) palladium (II), palladium acetylacetonate, palladium bis(acetonitrile) dichloride, palladium bis(dimethylsulfoxide) dichloride, palladium (II) acetate, palladium (II) hexafluoroisopropoxide, palladium (II) isopropoxide, palladium (II) hydroxide supported on carbon black, palladium (II) acetate supported on polystyrene modified dicyclohexyl(phenyl)phosphine, bis (tri-tert-butylphosphine) palladium (I) bromide dimer, tris (dibenzylideneacetone) dipalladium (O), tris (dibenzylideneacetone) dipalladium (O) chloroform adduct, bis (tricyclohexylphosphine) palladium (O), bis(tricyclohexylphosphine) palladium (II) acetate, and allyl palladium chloride dimer.

Virtually any fluorinated alcohol can be used in the catalyst systems of this invention. Hexafluoroisopropanol is a particularly preferred fluorinated alcohol.

A wide variety of fluorinated acids can also be used in the catalyst systems of this invention. Some representative examples of fluorinated acids that can be used include hydrofluoric acid (HF), trifluoroacetic acid ($CF_3COOH$), and triflic acid ($CF_3SO_3H$).

The ionic liquids that can be utilized in the catalyst systems of this invention are typically weakly coordinating ionic liquids of the formula:

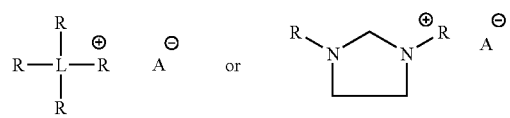

wherein L represents nitrogen or phosphorus, wherein the R groups are hydrocarbon radicals that can be the same or different, and wherein A represents Cl, Br, $NO_3$, $CF_3SO_3$, $PF_6$, or $SbF_6$.

The molar ratio of the palladium or a palladium compound to the member selected from the group consisting of fluorinated alcohols, fluorinated acids, and ionic liquids will very greatly with the specific catalyst components being employed and the monomer being polymerized. For instance, the molar ratio of the palladium or palladium compound to the member selected from the group consisting of fluorinated alcohols, fluorinated acids, and ionic liquids can vary from about 1:1 to about 1:100,000, and will typically be within the range of 1:500 to about 1:50,000. The molar ration of the palladium or palladium compound to the member selected from the group consisting of fluorinated alcohols, fluorinated acids, and ionic liquids will more typically be within the range of 1:1000 to 1:10,000. In some polymerizations it is preferred for the molar ratio of palladium or palladium compound to the member selected from the group consisting of fluorinated alcohols, fluorinated acids, and ionic liquids to be within the range of 1:4000 to 1:6000. The molar ratio of the monomer to the palladium or palladium compound will typically be within the range of 5,000:1 to 10,000,000:1, and will more typically be within the range of 10,000:1 to 1,000,000:1. In the polymerization of many norbornene-functional monomer it is preferred for the molar ratio of the monomer to the palladium or palladium compound to be within the range of 10,000:1 to 100,000:1.

Norbornene-functional monomers will typically be polymerized with the catalyst systems of this invention at a temperature which is within the range of about 0° C. to about 150° C., and will more typically be polymerized at a temperature which is within the range of 10° C. to 80° C. The norbornene-functional monomer will preferably be polymerized at a temperature which is within the range of 20° C. to 60° C.

Norbornene-functional monomers can be polymerized with the catalyst systems of this invention in bulk, vapor phase, or solution. In any case, the catalyst system is brought into contact with the norbornene-functional monomer to initiate the polymerization. The catalyst system can be premixed prior to the polymerization or the catalyst components can be added to the polymerization medium separately (prepared in situ). The order of addition of the various catalyst components to the reaction medium is not normally important.

Solution polymerizations can be carried out by adding a solution of the preformed catalyst or individual catalyst components to a solution of the norbornene-type monomer or mixtures of monomers to be polymerized. The level of monomers in the solvent preferably ranges from 10 weight percent to 50 weight percent, and more preferably ranges from 20 weight percent to 30 weight percent. After the single component catalyst or catalyst components are added to the monomer solution, the reaction medium is normally agitated (stirred or shook) to ensure complete mixing of catalyst and monomer components.

Some examples of solvents that can be used in the polymerization reaction include but are not limited to alkane and cycloakane solvents, such as pentane, hexane, heptane, and cyclohexane; halogenated alkane solvents such as dichloromethane, chloroform, carbon tetrachloride, ethyl-chloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; and aromatic solvents such as benzene, xylene, toluene, mesitylene, chlorobenzene, and o-dichlorobenzene, water; or mixtures thereof. Preferred solvents include normal-hexane, cyclohexane, toluene, mesitylene, dichloromethane, 1,2-dichloroethane, and water. It is frequently convenient to utilize a solvent that includes a mixture of various hexane isomers (hexanes solvent).

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this experiment norbornene monomer was polymerized into polynorbornene utilizing the catalyst system of this invention. In the procedure utilized 0.0019 grams ($8.5 \times 10^{-6}$ moles) of palladium acetate and 0.0024 grams ($8.5 \times 10^{-6}$ moles) of tricyclohexylphosphine were added as solids to 2 grams (0.0213 moles) of norbornene monomer. The mixture was then dissolved into 5 milliliters of toluene. Then 0.0050 grams ($2.5 \times 10^{-5}$ moles) of dimethyl zinc was added and color changes were observed. Then, 0.036 grams ($2.12 \times 10^{-4}$ moles) of hexafluoroisopropanol were added to the glass vial and rapid polymerization occurred with a high exotherm. Solid precipitated polymer formed in the vial with essentially 100% of the monomer being polymerized. The toluene solvent boiled off quickly.

COMPARATIVE EXAMPLE 2

The procedure utilized in Example 1 was repeated in this experiment except that tri-isobutyl aluminum was employed as the alkylating agent in place of the dimethyl zinc utilized in Example 1. Again rapid polymerization occurred with the result attained being essentially identical to the result experienced in Example 1.

EXAMPLE 3

The procedure utilized in Example 1 was repeated in this experiment except that the dimethyl zinc utilized in Example 1 was not added. Again rapid polymerization occurred and a yield of about 96% was attained.

EXAMPLE 4

The procedure utilized in Example 3 was repeated in this experiment and this time essentially 100% of the monomer was polymerized into polymer.

COMPARATIVE EXAMPLE 5

The procedure utilized in Example 1 was repeated in this experiment except that the hexafluoroisopropanol utilized in Example 1 was not added. Polymerization did not occur and no polymer was observed.

COMPARATIVE EXAMPLE 6

The procedure utilized in Example 2 was repeated in this experiment except that the hexafluoroisopropanol utilized in Example 1 was not added. Polymerization did not occur and no polymer was observed.

COMPARATIVE EXAMPLE 7

In the procedure utilized, 0.0024 grams of palladium acetate and 0.0030 grams of tricyclohexylphosphine were added to 1 gram (0.011 moles) of norbornene monomer. The mixture was then dissolved in toluene. Then, 0.1787 grams (0.0011 moles) of hexafluoroisopropanol was added to the resulting solution. The ratio of monomer moles to catalyst moles was 10,000 to 1. No resulting polymer was observed after 10 to 15 minutes.

COMPARATIVE EXAMPLE 8

The procedure utilized in Example 7 was repeated in this experiment except that the ratio of monomer moles to catalyst moles was 100,000 to 1. Again, no polymer was observed after 10 to 15 minutes.

EXAMPLE 9

The procedure utilized in Example 7 was repeated in this experiment except that immediately after the addition of the hexafluoroisopropanol, one drop of dimethyl zinc was added to the resulting solution. Rapid polymerization occurred with high exotherm. A polymer yield of essentially 100% resulted.

EXAMPLE 10

The procedure utilized in Example 8 was repeated in this experiment except that the ratio of monomer moles to catalyst moles was 100,000 to 1 instead of 10,000 to 1. Again, rapid polymerization occurred with high exotherm and a polymer yield of essentially 100% resulted.

EXAMPLE 11

In this experiment norbornene monomer was polymerized into polynorbornene utilizing the catalyst system of this invention. In the procedure utilized, 0.0051 grams of nickel octanoate (as a 10% solution) and 2 grams (0.02 moles) of norbornene monomer were dissolved into toluene. The molar ratio of monomer to nickel catalyst was 2500:1. Then, 0.1787 (0.0011 moles) of hexafluoroisopropanol was then added to the resulting solution. Initially, there was no apparent reaction, then a drop of dimethyl zinc was added. After 5 minutes, the solution polymerized resulting in a solid white plug.

COMPARATIVE EXAMPLE 12

In the procedure utilized, 0.0190 grams of palladium acetate and 0.0238 grams of tricyclohexylphosphine were premixed and then together with 2 grams (0.02 moles) norbornene monomer were dissolved in toluene. Then, 0.0143 grams of hexafluoroisopropanol were added to the resulting solution. A yellow solution formed, but no polymer was produced after 15 minutes at room temperature.

COMPARATIVE EXAMPLE 13

The procedure utilized in Example 12 was repeated in this experiment except that exo-norbornyl zinc bromide was used instead of hexafluoroisopropanol resulting in essentially the same results.

COMPARATIVE EXAMPLE 14

The procedure utilized in Example 12 was repeated in this experiment except that nickel octanoate was used instead of the premixed palladium acetate and tricyclohexylphosphine. There appeared to be no reaction with these components.

COMPARATIVE EXAMPLE 15

The procedure utilized in Example 13 was repeated in this experiment except that nickel ocatnoate was used instead of the premixed palladium acetate and tricyclohexylphosphine. A black precipitate came out of solution after 15 to 20 minutes at room temperature.

EXAMPLE 16

In this experiment, 1 gram of norbornene monomer (0.01 moles), 425 μl of a 2M solution of dimethyl zinc in toluene ($8.5 \times 10^{-4}$ moles) and 0.2980 grams of hexafluoroisopropanol were premixed. This mixture resulted in a cloudy solution after 1 to 2 minutes of reaction. The resulting solution was then poured into a solution containing 1 additional gram of norbornene monomer and premixed tricyclohexylphosphine and palladium acetate. Initially, there were no changes, but after 5 to 10 minutes there was a slight rise in viscosity. Rapidly, the solution formed into a solid plug, but no exotherm was detected. The monomer converted to essentially 100% polymer.

EXAMPLE 17

This experiment was a repeat of Example 16 and yielded the same results.

EXAMPLE 18

In this experiment, 2 gram of norbornene monomer (0.02 moles) was added to a reaction vessel. Then, 0.0190 grams of palladium acetate, which had been premixed with 0.0238 grams of tricyclohexyl phosphine was added to the norbornene monomer. Then, 35 μl of a 0.5 M solution of dibutyl magnesium in toluene ($3.4 \times 10^{-5}$ moles) was added. Finally, 0.2980 grams of hexafluoroisopropanol was added which caused to solution to turn yellow. No in crease in viscosity was observed for 15–30 minutes. However, after 1 hour the solution had solidified into a solid plug. The monomer converted to essentially 100% polymer. This experiment shows that dibutyl magnesium can be substituted into the catalyst system in the place of dibutyl zinc.

EXAMPLE 19

In this experiment 15 grams of dicyclopentadiene monomer was degassed and placed in a glass vial in a dry box. Then, 0.0074 grams of di-tert-butyl cyclohexyl phosphine, 0.0073 grams of palladium acetate, 0.01 grams of hexafluoroisopropyl alcohol ($5 \times 10^{-5}$ moles), and 50 μl of dimethyl zinc were added to the vial in that order. After 2 hours at 150° C. a solid puck was produced with a polymer yield of essentially 100 percent being attained.

EXAMPLE 20

The procedure employed in Example 19 was repeated in this experiment except that propylene norbornene was substituted for the dicyclodentadiene monomer polymerized in Example 19. After 1 hour a solid puck was produced with a polymer yield of essentially 100 percent being attained.

EXAMPLE 21

The procedure utilized in Example 20 was repeated in this experiment except that bis (pentafluorophenyl) zinc was substituted for the dimethyl zinc used in Example 20. The bis (pentafluorophenyl) zinc was also added prior to the addition of the hexafluoroisopropyl alcohol. After 10 minutes a solid puck was produced with a polymer yield of essentially 100 percent being attained.

EXAMPLE 22

The procedure utilized in Example 21 was repeated in this experiment except that tricyclohexyl phosphine was substituted for the di-tert-butyl cyclohexyl phosphine used in Example 21. After 3 days a solid puck was produced with a polymer yield of essentially 100 percent being attained. This experiment shows that the use di-tert-butyl cyclohexyl phosphine results in a much faster polymerization of propylene norbornene monomer than is attained with tricyclohexyl phosphine.

EXAMPLE 23

In this experiment 2.0 grams of norbornene acetate monomer (0.0132 moles) was degassed and placed in a glass vial in a dry box. Then, 0.2 grams of di-tert-butyl cyclohexyl phosphine, 0.0180 grams of palladium acetate ($2.6 \times 10^{-5}$ moles), 0.0105 grams of bis (pentafluorophenyl) zinc and 0.0221 grams of hexafluoroisopropyl alcohol ($1.3 \times 10^{-4}$ moles) and 50 μl of dimethyl zinc were added to the vial in that order. After 24 hours at 100° C. the polymer produced was recovered by pouring the solution into methanol which caused the polymer to precipitate out of the solution. A polymer yield of 80 percent was attained.

COMPARATIVE EXAMPLE 24

In this experiment a palladium acetate stock solution consisting of 0.0447 grams (0.066 moles) of di-tert-butyl cyclohexyl phosphine was added to a 25% by weight solution of norbornene acetate in toluene. To the resulting solution was added N,N-dimethyl annilinium tetrakis (pentafluorophenyl) borate. The solution was then heated to 100° C. for one week. The solution was then poured into methyl alcohol which precipitated 0.85 grams of polymer resulting in a 42% yield.

EXAMPLE 25

In this experiment, the di-tert-butyl cyclohexyl phosphine palladium (TFA)$_2$ was dissolved in 2 milliliters toluene and to this solution was added 1 milliliter of bis (pentafluorophenyl) zinc. There was no immediate color change. After 5 minutes, the color became a dark orange. Then, 4 grams (0.0263 moles) of norbornene acetate monomer was added to the solution followed by the hexafluoroisopropanol. The solution was dark orange. The solution was heated to 100° C. for 2 days. A black solution with high viscosity resulted. The solution was then diluted with tetrahydrafuran a yellowish brown color with no insolubles. The solution was then precipitated in methanol to bring about full conversion of polymer which was then dried under vacuum for 5 hours at 82° C. resulting in 4 grams of polymer, essentially a 100% yield. The polymer was redissolved in 35 milliliters of tetrahydrafuran and treated overnight with Anderlite™ IRC-50 resin. No changes were noted. The solution was filtered, then carbon monoxide was bubbled through the solution at 10 pounds per square inch mercury pressure for 4 hours at 65° C. The palladium precipitated out of solution slowly. A yellowish solution with a black precipitate remained. Decolorizing carbon was added to this solution and heated to 65° C. overnight. The solution was filtered 3 times through Whitman No. 4 paper then through a medium glass filter to remove the carbon black and rotovapped to approximately 30 milliliters of solution. The resulting solution turned a greenish color. The solution was filtered through 0.2 μ PTFE Acrodic. The resulting solution was a light yellow color which probably contained colloidal palladium in solution. The resulting yellow solution was poured into a petri dish and covered with a beaker to bring about evaporation of the tetrahydrafuran, forming a uniform film which was approximately 13% by weight of the solution.

EXAMPLE 26

In this experiment, 1.0 gram (0.0066 moles) of methyl norbornene acetate monomer was added to 0.0518 grams (6.6×10$^{-5}$ moles) of the palladium catalyst in toluene. The alkylating agent, namely, tri-ethyl aluminum was added followed by 0.1769 grams (0.0011 moles) of hexafluoroisopropanol. The solution was heated to 100° C. on a hot plate and allowed to run overnight for 18 hours. The solution within minutes became viscous turning a yellowish-brown color. The solution was cooled, diluted to 7 milliliters in tetrahydrafuran and precipitated into 100 milliliters of methanol. The reaction resulted in 0.60 grams of polymer (60% yield). The polymer had a weight average molecular weight (Mw) of 11,600, a number average molecular weight (Mn) of 9,770, and a polydispersity (Mw/Mn) of 1.2.

EXAMPLE 27

The procedure utilized in Experiment 26 was repeated in this experiment except that 0.0076 grams of trimethyl gallium was used instead of the tri-ethyl aluminum. After 18 hours, the solution became viscous turning a yellowish-brown color. This reaction resulted in 0.90 grams of polymer (90% yield). The polymer had a Mw of 15,410, a Mn of 14,000 and a polydispersity (Pd) of 1.1.

EXAMPLE 28

In this experiment, 0.1769 grams (0.0011 moles) of hexafluoroisopropyl alcohol was added to the palladium and the norbornene acetate monomer. Diethyl zinc was then added to the resulting solution. The solution was heated to 100° C. for 18 hours. Within 10 minutes, the solution became viscous turning a yellowish-brown color. This reaction resulted in 1.00 gram of polymer (essentially, 100% yield). The polymer had a Mw of 24,920, a Mn of 17,650 and a Pd of 1.4.

EXAMPLE 29

In this experiment, 1.00 gram (0.0066 moles) of methyl norbornene acetate monomer was added to 6.57×10$^{-6}$ moles of di-tert-butyl cyclohexyl phosphine palladium acetate. To this solution was added 0.17 grams (0.001 moles) of hexafluoroisopropanol and excess, 0.023 grams (1.87×10$^{-4}$ moles) diethyl zinc. The solution initially did not seem to react, then after 30 minutes, the solution quickly became viscous. The reaction resulted in 0.97 grams of polymer (97% yield) having a Mw of 91,000, a Mn of 53,400 and a Pd of 1.7.

EXAMPLE 30

The procedure utilized in Experiment 29 was repeated except that the molar ratio of monomer to catalyst was 10,000:1 instead of 1,000:1, meaning 6.57×10$^{-7}$ instead of 6.57×10$^{-6}$ palladium compound. The reaction was slower and produced 1.00 gram of polymer (essentially 100%) having a Mw of 123,600, a Mn of 51,870 and a Pd of 2.4.

EXAMPLE 31

The procedure utilized in Experiment 29 was repeated except that excess, 0.02 grams (1.75×10$^{-4}$ moles) of tri-ethyl aluminum was used instead of excess diethyl zinc. The reaction resulted in 0.83 grams (83% yield) of polymer having a Mw of 50,240, a Mn of 24,440 and a Pd of 2.0.

COMPARATIVE EXAMPLE 32

The procedure utilized in Example 31 was repeated except that the molar ratio of monomer to catalyst was 10,000:1 instead of 1,000:1. The result was that no polymer was produced.

EXAMPLE 33

The procedure utilized in Example 29 was repeated except that the molar ratio of monomer to catalyst was 10,000:1 instead of 1,000:1 and instead of excess diethyl zinc, only a small amount of diethyl zinc was used. The results were a very fast reaction that produced 1.00 gram of polymer (essentially a 100% yield), a Mw of 154,000, a Mn of 80,000 and a Pd of 1.9.

EXAMPLE 34

The procedure utilized in Example 29 was repeated in this experiment except that bis (pentafluorophenyl) zinc was used as the alkylating agent instead of the diethyl zinc. The reaction resulted in 0.90 grams of polymer (90% yield) having a Mw of 57,080, a Mn of 35,000 and a Pd of 1.63.

COMPARATIVE EXAMPLE 35

The procedure utilized in Example 34 was repeated in this experiment except that the bis (pentafluorophenyl) dimethyl tin was used as the alkylating agent instead of the bis (pentafluorophenyl zinc. The result was that no polymer was produced.

EXAMPLE 36

In this experiment, a 10 milliliter vial was placed in a dry box. 100 microliters of a palladium acetate stock solution consisting of 0.0295 grams of palladium acetate in 20 milliliters of toluene (0.0066 M) was added to the vial followed by 0.060 grams dicyclopentylphosphine. 0.14 grams of hexafluoroisopropanol ($8.3\times10^{-4}$ moles) was then added to the vial. To the solution was added, 1.68 grams of triethoxysilylnorbornene (0.0066 moles) monomer, the toluene diluent and the 0.0010 grams of diethyl zinc ($8.13\times10^{-6}$ moles). The vial was then placed on a 100° C. hot plate overnight. After approximately 18 hours, the reaction produced 1.39 grams of polymer which was a yield of 83%.

EXAMPLE 37

The procedure utilized in Example 36 was repeated in this experiment except that dicyclohexylphosphine was substituted for the dicyclopentylphosphine. The reaction resulted in 1.37 grams of polymer with a yield of 82%.

EXAMPLE 38

The procedure utilized in Example 36 was repeated in this experiment except that di(2-norbornyl)phosphine was substituted for the dicyclopentylphosphine. The reaction resulted in 1.46 grams of polymer with a yield of 87%.

EXAMPLE 39

The procedure utilized in Example 36 was repeated in this experiment except that di-tert-butylphosphine was substituted for the dicyclopentylphosphine. The reaction resulted in 0.88 grams of polymer with a yield of 52%.

EXAMPLE 40

The procedure utilized in Example 36 was repeated in this experiment except that titanium tetrabutylrate was substituted for the diethyl zinc. The reaction resulted in 1.44 grams of polymer with a yield of 86%.

EXAMPLE 41

The procedure utilized in Example 37 was repeated in this experiment except that titanium tetrabutylrate was substituted for the diethyl zinc. The reaction resulted in 1.39 grams of polymer with a yield of 83%.

EXAMPLE 42

The procedure utilized in Example 38 was repeated in this experiment except that titanium tetrabutylrate was substituted for the diethyl zinc. The reaction resulted in 1.46 grams of polymer with a yield of 87%.

EXAMPLE 43

The procedure utilized in Example 39 was repeated in this experiment except that titanium tetrabutylrate was substituted for the diethyl zinc. The reaction resulted in 1.13 grams of polymer with a yield of 67%.

EXAMPLE 44

The procedure utilized in Example 37 was repeated in this experiment except that the diethyl zinc was premixed with the palladium acetate and the dicyclohexylphosphine before the addition of the hexafluoroisopropanol. The reaction resulted in 0.92 grams of polymer with a yield of 55%.

COMPARATIVE EXAMPLE 45

In this experiment, 1.68 grams triethoxysilyl norbornene (0.0066 moles) was added to a 10 milliliter vial. This was followed by the palladium acetate catalyst, the hexafluoroisopropanol, toluene and then the di-tert-butylphosphine palladium acetate co-catalyst. The contents of the vial were heated to 100° C. for 18 hours in a drybox. Methanol was added to the solution to facilitate precipitation, and then the solution was filtered and dried in a vacuum. This experiment produced no polymer thus resulting in a 0% yield.

EXAMPLE 46

In this experiment, the di-tert-butyl cyclohexyl phosphine palladium acetate was added to 1 gram of norbornene methyl ester monomer followed by the hexafluoroisopropanol. The diethyl zinc was then added. The molar ratio of momomer to palladium to fluorinated alcohol was 10,000:1:285. The solution was heated to 100° C. After 16 hours, the solution was viscous. The reaction produced 0.60 grams of polymer, a yield of 60%. The weight average molecular weight (Mw) of the polymer was 98,000, the number average molecular number (Mn) was 58,000, and the polydispersity (Pd) was 1.7.

EXAMPLE 47

The procedure utilized in Example 46 was repeated in this experiment except that $(PtBu_2Cy)_2Pd(TFA)_2$ was substituted for the di-tert-butyl cyclohexyl phosphine palladium acetate employed in Example 46. The reaction produced 0.96 grams of polymer which represented a yield of 96%. The weight average molecular weight (Mw) of the polymer was 106,000, the number average molecular number (Mn) was 54,000, and the polydispersity (Pd) was 1.95.

EXAMPLE 48

The procedure utilized in Example 47 was repeated in this experiment except that the level of diethyl zinc employed was increased to a molar ratio to palladium of 1235:1. The reaction produced 0.70 grams of polymer which represented a yield of 70%. The weight average molecular weight (Mw) of the polymer was 67,000, the number average molecular number (Mn) was 39,000, and the polydispersity (Pd) was 1.72.

EXAMPLE 49

The procedure utilized in Example 47 was repeated in this experiment except that nonafluoro-tert-butanol was substituted for the hexafluoroisopropanol utilized in Example 47. The level of fluorinated alcohol was also reduced to a molar ratio to palladium of 1930:1. The reaction produced 0.66 grams of polymer which represented a yield of 66%.

EXAMPLE 50

The procedure utilized in Example 47 was repeated in this experiment except that the level of hexafluoroisopropanol was reduced to a molar ratio to palladium of 1360:1 and the level of diethyl zinc was reduced to a molar ratio to palladium of 25:1. The polymerization resulted in a yield of less than 10%.

EXAMPLE 51

The procedure utilized in Example 50 was repeated in this experiment except that the level of hexafluoroisopropanol was increased to a molar ratio to palladium of 2800:1. The polymerization again resulted in a yield of less than 10%.

EXAMPLE 52

The procedure utilized in Example 50 was again repeated in this experiment except that the level of hexafluoroisopropanol being further increased to a molar ratio to palladium of 5600:1. In this case the polymerization resulted in a yield of 85%.

EXAMPLES 53–60

In this series of experiments norbornene methyl ester was polymerized with a catalyst system that was comprised of di-tert-butyl cyclohexyl phosphine palladium acetate, hexafluoroisopropanol (HFIPA), and diethyl zinc. The molar ratio of norbornene methyl ester monomer to di-tert-butyl cyclohexyl phosphine palladium acetate to dimethyl zinc was 10,000:1:25. The molar ratio of the hexafluoroisopropanol to palladium is shown in Table I. The polymer yield attained, and the Mw, Mn, and Pd of the polymer synthesized are also reported in Table I.

TABLE I

| Example | HFIPA:Pd | Yield | Mw | Mn | Pd |
|---------|----------|-------|--------|--------|------|
| 53 | 2714:1 | trace | — | — | — |
| 54 | 3166:1 | trace | — | — | — |
| 55 | 3619:1 | trace | — | — | — |
| 56 | 4071:1 | 86% | 84,000 | 54,000 | 1.5 |
| 56 | 4524:1 | 71% | 64,000 | 42,000 | 1.5 |
| 58 | 4976:1 | 91% | 104,000 | 59,500 | 1.75 |
| 59 | 5429:1 | 91% | 113,000 | 70,000 | 1.6 |
| 60 | 5881:1 | 96% | 134,000 | 78,5000 | 1.7 |

This series of experiments shows that polymer yields can be increased by increasing the ratio of HFIPA to palladium.

EXAMPLES 61–64

In this series of experiments norbornene methyl ester was polymerized with a catalyst system that was comprised of di-tert-butyl cyclohexyl phosphine palladium acetate, hexafluoroisopropanol (HFIPA), and diethyl zinc. The molar ratio of norbornene methyl ester monomer to di-tert-butyl cyclohexyl phosphine palladium acetate to hexafluoroisopropanol to dimethyl zinc was 10,000:1:5881:50. The order of addition of the various catalyst components was evaluated by adding them in different orders as shown in Table II.

TABLE II

| Example | Order of Catalyst Component Addition | | | | Yield |
|---------|---------|---------|---------|---------|-------|
| 61 | monomer | Pd* | ZnEt$_2$* | HFIPA | 100% |
| 62 | monomer | Pd* | HFIPA* | ZnEt$_2$ | 75% |
| 63 | Pd* | ZnEt$_2$* | HFIPA* | monomer | 60% |
| 64 | monomer | ZnEt$_2$* | HFIPA* | Pd | 15% |

*indicates that these catalyst components were premixed

The Mn, Mw, and Pd of the polymers synthesized is reported in Table III.

TABLE III

| Example | Mw | Mn | Pd |
|---------|---------|---------|------|
| 61 | 276,000 | 154,000 | 1.8 |
| 62 | 235,000 | 139,000 | 1.7 |
| 63 | 212,000 | 127,000 | 1.67 |
| 64 | 154,000 | 89,500 | 1.7 |

EXAMPLE 65

In this experiment, the di-tert-butyl cyclohexyl phosphine palladium acetate was added to 1 gram of norbornene methyl ester monomer followed by the addition of diethyl zinc and hexafluoroisopropanol. The molar ratio of monomer to palladium to fluorinated alcohol to diethyl zinc was 20,000:1:5881:50. After 18 hours and 100° C. the polymer yield attained was determined to be 85%.

EXAMPLE 66

In this experiment the procedure utilized in Example 65 was repeated except that the level of monomer was increased to a ratio of monomer to palladium of 40,000:1. The polymer yield attained was reduced to about 17%.

EXAMPLE 67

In this experiment norbornene n-butyl ester was polymerized by the sequential addition of di-tert-butyl cyclohexyl phosphine palladium acetate, diethyl zinc, the norbornene n-butyl ester monomer, and finally hexafluoroisopropanol to a polymerization vessel. The molar ratio of monomer to palladium to fluorinated alcohol to diethyl zinc was 10,000:1:5881:50. After 18 hours and 100° C. the polymer yield attained was determined to be 55%.

EXAMPLE 68

In this experiment norbornene methyl ester was polymerized by the sequential addition of di-tert-butyl cyclohexyl phosphine palladium acetate, diethyl zinc, the norbornene methyl ester monomer, and finally hexafluoroisopropanol to a polymerization vessel. The molar ratio of monomer to palladium to fluorinated alcohol to diethyl zinc was 10,000:1:5881:50. After 18 hours and 100° C. the polymer yield attained was determined to be 100%.

EXAMPLE 69

In this experiment the procedure utilized in Example 68 was repeated except that the level of norbornene methyl ester monomer was increased to a ratio of monomer to palladium of 20,000:1. The polymer yield attained was reduced to about 85%.

EXAMPLE 70

In this experiment the procedure utilized in Example 68 was repeated except that the level of norbornene methyl ester monomer was increased to a ratio of monomer to palladium of 40,000:1. The polymer yield attained was reduced to about 45%.

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing a norbornene-functional polymer which comprises polymerizing a norbornene-functional monomer in a solvent in the presence of a catalyst system that consists of (a) palladium or a palladium compound (b) a member selected from the group consisting of fluorinated alcohols, fluorinated acids, and ionic liquids, and (c) optionally a Lewis acid.

2. A process as specified in claim 1 wherein the norbornene-functional monomer is norbornene acetate.

3. A catalyst system that is especially useful for the polymerization of norbornene-functional monomers which is comprised of (a) a procatalyst reactant of the structural formula $PdXX'L_nL'_m$, wherein X represents a first anionic ligand, wherein X' represents a second anionic ligand, wherein the second anionic ligand can be the same or different from the first anionic ligand, wherein L represents a first neutral ligand, wherein L' represents and second neutral ligand, wherein n is an integer from 0 to 3, wherein m is an integer from 0 to 3, and wherein the second neutral ligand can be the same or different from the first neutral ligand, and (b) an activator of the structural formula $G_{4-n}$-$X$-$A_n$, wherein X represents a member selected from the group consisting of carbon, silicon, and germanium, wherein G represents a hydrocarbyl radical that is substituted with at least one fluorine atom, wherein A represents a —OH group, a —COOH group, or a —C(O)Cl group, and wherein n represents the integer 1 or the integer 2.

4. A catalyst system as specified in claim 3 wherein said catalyst system is further comprised of a cocatalyst of the structural formula $M_n$, wherein M represents a metal selected from the group consisting of Zn, Ti, Zr, Nb, V, Ta, Sc, Li, Na, Mg, Ca, and Y, wherein the R groups can be the same or different and are selected from the group consisting of alkoxide groups, halides, amides, phosphides, and hydrocarbyl groups, and wherein n represents an integer from 1 to 6.

5. A catalyst system as specified in claim 4 wherein the cocatalyst is heterogeneous.

6. A catalyst system as specified in claim 4 wherein the cocatalyst is homogeneous.

7. A catalyst system as specified in claim 4 wherein the cocatalyst is supported.

8. A catalyst system as specified in claim 4 wherein the cocatalyst is supported on carbon black or polystyrene modified with a phosphine, sulfur, or oxygen.

9. A catalyst system as specified in claim 4 wherein the catalyst system is further comprised of a neutral ligand.

10. A catalyst system as specified in claim 9 wherein the neutral ligand is of the structural formula $GR_3$, wherein G represents a member selected from the group consisting of N, P, As, Sb, S and O, and wherein the R groups can be the same or different and represent hydrocarbyl groups or fluorocarbon groups.

11. A catalyst system as specified in claim 9 wherein the neutral ligand is of the structural formula:

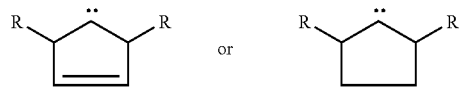

wherein the R groups can be the same or different and represent hydrocarbyl groups or fluorocarbons radicals.

12. A catalyst system as specified in claim 4 wherein the catalyst system is further comprised of a heterogeneous base of the structural formula: $L^+A^-$, wherein L+ is selected from the group consisting of $K^+$, $Li^+$, $Na^+$, $Mg^+$, $Ca^+$, $Rb^+$, $H^+$, $Ba^+$, and $Cs^+$, and wherein $A^-$ is selected from the group consisting of $CO_3^-$, $X^-$, and $SO_4^-$, wherein X represents a halogen atom.

13. A process as specified in claim 1 wherein the norbornene-functional monomer is 2-vinyl-2-norbornene and wherein the norbornene functional polymer is poly(2-vinyl-2-norbornene).

14. Poly(2-vinyl-2-norbornene).

15. A process for synthesizing a norbornene-functional polymer which comprises polymerizing a norbornene-functional monomer in a solvent in the presence of a catalyst system that is comprised of (a) palladium or a palladium compound and (b) an ionic liquid.

16. A process as specified in claim 1 wherein said Lewis acid is present in the catalyst system.

17. A process as specified in claim 1 wherein the palladium compound is selected from the group consisting of trans-$PdCl_2(PPh_3)_2$, palladium (II) bis(trifluoroacetate) palladium (II) bis(acetylacetonate), palladium (II) 2-ethylhexanoate, $Pd(acetate)_2(PPh_3)_2$, palladium (II) bromide, palladium (II) chloride, palladium (II) iodide, palladium (II) oxide, monoacetonitriletris(triphenylphosphine) palladium (II) tetrafluoroborate, tetrakis(acetonitrile) palladium (II) tetrafluoroborate, dichlorobis(acetonitrile) palladium (II), dichlorobis(triphenylphosphine) palladium (II), dichlorobis(benzonitrile) palladium (II), palladium acetylacetonate, palladium bis(acetonitrile) dichloride, and palladium bis(dimethylsulfoxide) dichloride.

18. A process as specified in claim 1 wherein the member selected from the group consisting of fluorinated alcohols, fluorinated acids, and ionic liquids is a fluorinated alcohol.

19. A process as specified in claim 18 wherein the fluorinated alcohol is hexafluoroisopropanol.

20. A process as specified in claim 15 wherein the ionic liquid is of the structural formula:

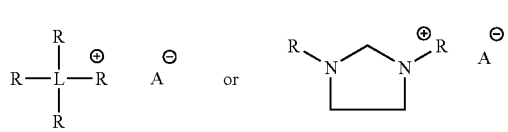

wherein L represents nitrogen or phosphorus, wherein the R groups are hydrocarbon radicals that can be the same or different, and wherein A represents a member selected from the group consisting of Cl, Br, $NO_3$, $CF_3SO_3$, $PF_6$, and $SbF_6$.

* * * * *